US012258105B2

(12) United States Patent
Roller

(10) Patent No.: US 12,258,105 B2
(45) Date of Patent: Mar. 25, 2025

(54) STERN OPERATIVELY MOUNTED UNIVERSAL SONIC TRANSDUCER FOR BOAT

(71) Applicant: CLEARWATER CONCEPTS OF MISSOURI, LLC, Purdy, MO (US)

(72) Inventor: Michael L. Roller, Purdy, MO (US)

(73) Assignee: CLEARWATER CONCEPTS OF MISSOURI, LLC, Purdy, MO (US)

( * ) Notice: Subject to any disclaimer, the term of this patent is extended or adjusted under 35 U.S.C. 154(b) by 263 days.

(21) Appl. No.: 17/300,665

(22) Filed: Sep. 16, 2021

(65) Prior Publication Data

US 2022/0106025 A1 Apr. 7, 2022

Related U.S. Application Data

(60) Provisional application No. 63/204,486, filed on Oct. 6, 2020.

(51) Int. Cl.
*B63B 79/15* (2020.01)
*B63B 3/40* (2006.01)
*G10K 11/00* (2006.01)

(52) U.S. Cl.
CPC ................ *B63B 79/15* (2020.01); *B63B 3/40* (2013.01); *G10K 11/004* (2013.01)

(58) Field of Classification Search
CPC .......... B63B 79/15; B63B 3/40; G10K 11/004
See application file for complete search history.

(56) References Cited

U.S. PATENT DOCUMENTS 4,555,233 A 11/1985 Klammer et al.
4,982,924 A * 1/1991 Havins ................ G10K 11/006 248/295.11
5,016,225 A * 5/1991 Blomberg ............ G10K 11/006 248/205.5
5,465,633 A 11/1995 Bernloehr
6,254,441 B1 7/2001 Knight et al.
6,325,685 B1 * 12/2001 Knight ................ B63H 20/007 440/53
6,431,923 B1 8/2002 Knight et al.
(Continued)

*Primary Examiner* — Isam A Alsomiri
*Assistant Examiner* — Abdallah Abulaban
(74) *Attorney, Agent, or Firm* — Armstrong Teasdale LLP

(57) ABSTRACT

A stern operatively mounted universal transducer for boat includes a mounting device, having upper and lower brackets, for securement to the boat, preferably its transom, the upper and lower brackets secure a drive cylinder, which when operative, lowers a drive rod for shifting a sonic transducer upwardly above the water, or downwardly into the water to scope the surrounding underwater typography. A pair of guide rods shiftably extend through the upper and lower brackets, and at their upper ends, secure to a motor and gear housing, the guide rods at their lower ends secure to a base plate. A transducer shaft extends into the motor housing which provides for its pivoting, and at its lower end, extends downwardly through the base plate, and secures a transducer mounting plate, to which the transducer is affixed, in preparation for its usage. Electrical, pneumatic, or hydraulic pressure can be used to pivot the transducer shaft, and to raise and lower the base plate that connects with the drive shaft, the latter when operative, raises or lowers the entire transducer assembly into and out of the water, during application.

20 Claims, 7 Drawing Sheets

(56) References Cited

U.S. PATENT DOCUMENTS

| | | | |
|---|---|---|---|
| 7,056,166 | B2 | 6/2006 | Bernloehr |
| 7,722,417 | B2 | 5/2010 | Bernloehr et al. |
| 7,972,188 | B2 | 7/2011 | Bernloehr et al. |
| 9,296,455 | B2 | 3/2016 | Bernleohr et al. |
| 9,322,915 | B2 | 4/2016 | Betts et al. |
| 9,676,462 | B2 | 6/2017 | Bernloehr et al. |
| 10,035,575 | B2 | 7/2018 | Bernloehr et al. |
| 10,107,908 | B2 | 10/2018 | Betts et al. |
| 10,281,576 | B2 | 5/2019 | DePasqua |
| 10,293,900 | B1 * | 5/2019 | Leonard ................. F16M 11/26 |
| 11,217,216 | B2 * | 1/2022 | Vance .................. G10K 11/355 |
| 2018/0281914 | A1 | 10/2018 | Burton et al. |

* cited by examiner

STERN OPERATIVELY MOUNTED UNIVERSAL SONIC TRANSDUCER FOR BOAT

CROSS REFERENCE TO RELATED APPLICATIONS

This is a nonprovisional patent application that claims priority to the provisional application Ser. No. 63/204,486, filed on Oct. 6, 2020; and this application claims priority as a continuation-in-part of the non-provisional patent application having Ser. No. 17/300,082, filed on Mar. 3, 2021.

FIELD OF THE INVENTION

This invention relates to a transducer for application to a fishing boat, one that can be mounted to its transom or rear gunnels or the side of the boat, and which transducer can be automatically raised or lowered, and said transducer directionally oriented, for the purpose of directing its sonar within an approximately 360° range, to detect and provide a clear and unobstructed scan of a distant region of the water, surrounding the boat, and towards the bottom, for the benefit of the boat operator, and its fishermen.

BACKGROUND OF THE INVENTION

This invention adds even further improvements to the method and system of utilizing a sonar transducer for use for scoping the underwater region both for distant viewing, and for providing a clear indication of the bottom contours of the lake or river, and which transducer can be automatically raised and lowered, and said transducer directionally oriented, by simple manipulation of various switches at the control of the operator of the boat, during their piscatorial pursuits.

Trolling motors for use with boats have been available for many, many years, dating back to the 1950's, as best understood. Sonar devices, in the form of transducers, came into existence approximately in the 1970's and provided for the use of sonar for scoping the proximate location of the underwater region, surrounding the boat, to aid the fisherman in what became identified as the fish finder, for use for that purpose. This type of equipment is now standard in the art of fishing, and anytime one views the professional tournaments videos as displayed on TV, all of this type of equipment is provided on every boat, to aid the fishermen in pursuit of the trophy size and type of fish.

Such transducers have improved to such an extent that said sonar is now capable of being applied to scanning the bottom of the water up to approximately 200 feet deep, and at the same time 200 feet forwardly of the transducer, provided the water is reasonably clear, to provide a more thorough view of the entire region, the location of any brush pile fish attraction, and the location of any individual or schools of fish, to aid the fishermen in obtaining direct knowledge of the actual location of the fish, during participation in this activity. Such transducers are identified in the market as the live scope transducer, and is available from Garmin Ltd., located in Olathe, Kansas. Other companies provide related types of sonic transducers. This type of scope is quite effective in providing a view of the surrounding underwater area, even up to 360°, but the current usage of such mounts, of the transducer to the boat, sometimes are difficult to obtain unobstructed view of the underwater surrounding areas, for failure to clear the bottom of a trolling motor, the boat, the primary motor of the boat, as can be understood. Furthermore, it takes a significant amount of activity on the part of the boat operator, to manipulate all of these components, in order to get a clear and clean usage of the transducer, in preparation for its activation and usage.

Some transducers are mounted on the shaft of the trolling motor, and therefore, only obtain their direction of scoping depending upon the direction of the trolling motor itself, during usage. Furthermore, the trolling motor shaft, its motor, and blade, can sometime cause obstruction to the effective usage of the transducer.

Various prior art patents showing these various instruments can be seen, for example, in the United States patent to Klammer, et al, U.S. Pat. No. 4,555,233, where its trolling motor can be pivoted downwardly into the water, when used, but that it can be pivoted upwardly upon its mount, and pulled into the boat, as during non-usage. Other types of standard trolling motors can be seen in a variety of prior art patents, such as U.S. Pat. Nos. 6,254,441; 5,465,633; 6,325,685; 7,722,417; 7,972,188; and 9,296,455.

Any patents to the aforesaid Garmin can be seen in U.S. Pat. No. 10,281,576, disclosing a method for predetermining underwater objects using a rotatable scan sonar unit linked to the boat.

This provides a brief history of these types of transducer devices, and trolling motors, as known to the applicant herein.

SUMMARY OF THE INVENTION

This current invention contemplates the structure and method of operation for the mounting of a sonic transducer to a boat, preferably at the stern end of the boat, or upon its transom, although it may be mounted at other locations upon the fishing boat, for preparation and usage. Essentially, this invention and structure provides for the mounting of a sonic transducer, for automatic operations, onto a bracket that holds the transducer's holding shaft for an approximately 360° pivot or rotation, and at the same time, the transducer shaft and its operative components, including the mounted transducer, are secured to a mounting bracket, that incorporates a mechanized shaft that raises or lowers the transducer shaft, down into the water, for usage, or for its raising, to automatically take the transducer out of the water, in preparation for high speed movement of the fishing boat. That motor mount, incorporates its bracket that secures directly to the boat transom, the side of the boat, preferably at its stern end, although it can be located at other positions about the boat, and which can be remotely operated through electrical controls, to provide for full functioning of the instrument, in preparation for its usage and application in furnishing a wide spread scan of the underwater environment surrounding the boat, as previously described, currently, up to a couple of hundred feet downwardly, and in all directions, for full 360° viewing of the underwater typography proximate the boat.

Initially, the mounting bracket includes a bracket means, having upper and lower bracket supports, that mount various operative components, initially, at least one guide rod for stabilizing the upper and lower movements of the transducer shaft, relative to the identified mount. Secondly, the bracket mount includes the securement of a housing, that supports a drive shaft, that can be raised or lowered relative to the bracket, and which secures with the transducer shaft of the instrument, which drive shaft when retracted, raises the sonic transducer upwardly and out of the water, but that when the drive shaft is extended, forces the sonic transducer and its shaft, vertically downwardly into the water, at a region below the bottom of the boat, and other motors operatively associated with the fishing vessel.

In addition, the transducer shaft, at its upper end, includes means for providing for pivoting, if not rotation, of the transducer shaft, in order to turn the transducer shaft in a complete approximately 360° of pivot, in order to allow the operator to obtain full scanning of the underwater region, for some distance, in all directions, under the boat, to provide a complete image of the topography of the underwater region, and the location of any fish, or other observable structures, that may indicate the presence of fish, for the benefit of the occupant fishermen. Connecting with the upper end of the transducer shaft is a gear reducer, and motor, that can provide for that rotation of the transducer, during its usage and application.

In summary, the entire instrument provides for full operational movements to the transducer, both in its raising and lowering relative to its connection with the fishing boat, and to further provide for its scanning in a full 360° imaging, of the underwater typography, during its usage and application, all of which can be done electronically, hydraulically or pneumatically, depending upon the motor accessories that are integrated into the structure of this stern mounted universal transducer for the attached boat.

It is, therefore, the principal object of this invention to provide a mounted attachment for the sonic transducer that provides for its full independent operations, being attached to the side or stern of the boat, and which can be automatic and manipulated by the boat operator, through various electrical, electronic, or pneumatic controls, furnishing the raising or lowering of the sonic transducer, and its rotation, when viewing underwater typography for favorable fishing or other locations.

Another principal object of this invention is to provide a mounting bracket, for operatively connecting the various drive shaft and its housing, and guide rods, that furnish automatic raising or lowering of the sonic transducer, in preparation for its usage.

A further object of this invention is to provide bracketing means for mounting of a transducer shaft, its transducer, and its pivotal attributes through the guide rod(s) and drive shaft of the elevational means bracketed to the stern of the vehicle, in its application.

A further object of this invention is to provide for the automatic controlling of a sonic transducer, operatively associated with the fishing boat, so that its positioning, vertically, relative to the boat, and its pivoting for full scanning of the underwater region, can be automatically performed by the operator of the vessel.

These and other objects may become more apparent to those skilled in the art upon review of the Summary of the Invention as provided herein, and upon undertaking a study of the Description of its Preferred Embodiment, in view of the drawings.

BRIEF DESCRIPTION OF THE DRAWINGS

In referring to the drawings:

FIG. 5(*b*) is a side view of the operative transducer mount in its lowered condition;

FIG. 7(*b*) is a side view of the transformer bracket of FIG. 7(*a*);

FIG. 8(*b*) is a side view of the upper bracket as disclosed in FIG. 8(*a*).

DESCRIPTION OF THE PREFERRED EMBODIMENT

This invention, as previously summarized, relates to an operatively mounted transducer for a boat, generally which may be installed at the stern region of the boat, as upon its transom, or back sides, to furnish universal operations for its transducer, to scan the surrounding regions of the underwater typography, to the benefit of the fishermen applying their skills upon the boat. Such an operatively mounted device could also be located at other regions around the periphery of the boat, as can be understood.

Figure 1:
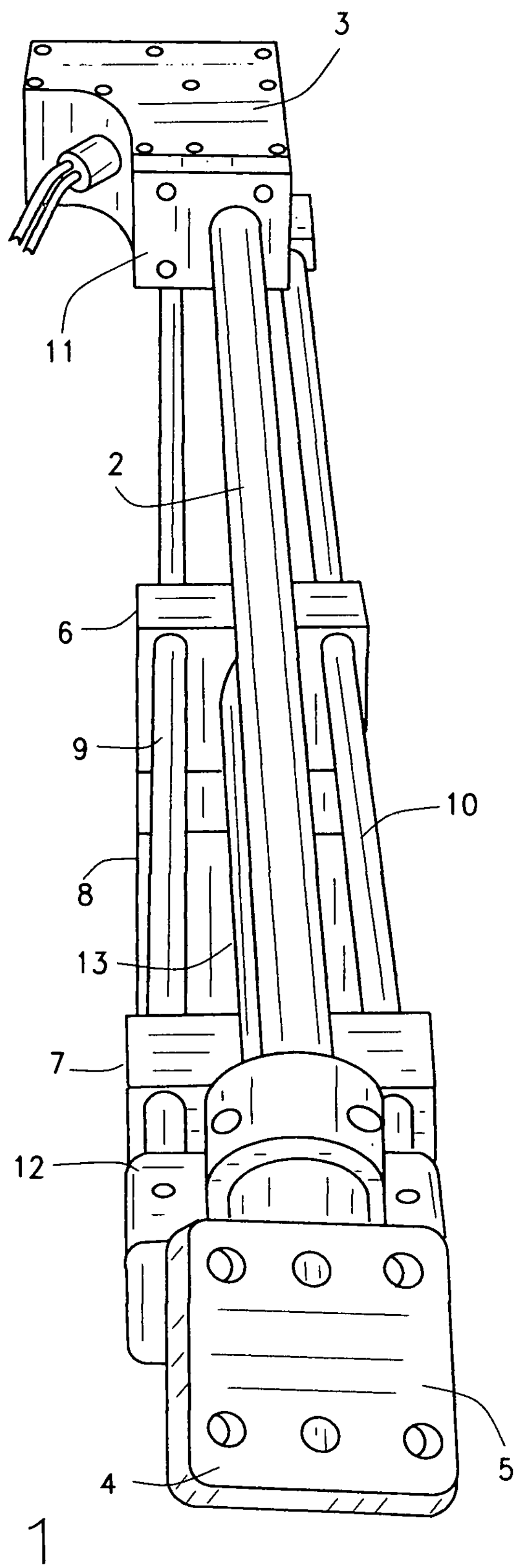
FIG. 1 provides an isometric view of the stern mounted universal transducer for boat of this invention.

As noted in FIG. 1 of the drawings, the stern operatively mounted universal transducer for boat is noted at 1. As disclosed, it shows the transducer shaft 2 which, at its upper end, is provided with a housing, as at 3, which includes a motor, gear reduction means, all of which provides for the rotation, both clockwise, or counterclockwise, of the shaft 2, to provide for rotation of its lower transducer bracket 4, which has secured to it the sonar transducer (not shown) applied to the surface 5 of said transducer bracket. As will be subsequently described. The housing 3 may include, for example, a 12-volt operative reversable motor, where the motor is attached to its gear mount, and the reduction gears, in order to provide for a more slower turn to the transducer shaft 2, during its usage and application. Such a reversing motor, as known in the art, can be obtained from a manufacturer such as Grearpisan Co., located in Shenzen, China.

Also shown in FIG. 1 is an upper bracket 6, and a lower bracket 7, and these may be secured to a base plate 8 to provide the means for attachment of the bracketed plate to the transom or other area of the boat, as previously described. Noted are a pair of guide rods 9 and 10 that extend through the upper and lower brackets 6 and 7, and at their upper ends, they secure with the plate 11 that mounts to the underside of the housing 3, as can be noted. The lower end of the guide rods 9 and 10 secure with a transformer bracket 12, and these guide rods extend through the upper and lower brackets 6 and 7, to provide for their vertical sliding movement therethrough, during manipulation and operations of this mounting device 1.

Mounted between the upper and lower brackets 6 and 7 also is a cylinder housing 13, and the shaft includes a drive rod 14 that secures to the transformer bracket 12, as previously described, with respect to FIG. 1. See also FIGS. 5(*a*) and 5(*b*). The cylinder housing 13 may secure with a motor means 15, which may be an electric motor, hydraulic motor, pneumatic motor, or screw driven motor, in order to provide for the extension or withdrawal of its drive rod 14, from within its housing 13, so that the entire transformer bracket 12, and its supported transducer shaft 2, in addition to the transducer bracket 4, can be raised or lowered down into the water, or elevated upwardly, out of the water, as required during usage of this device. The motor cylinder housing 3 is secured to the two guide rods 9 and 10 so that the housing 3, its transducer shaft 2, and their locating through the transformer bracket 12, can be all shifted upwardly, as noted in FIG. 5(*a*), or can be lowered, as noted in FIG. 5(*b*).

Figure 2:
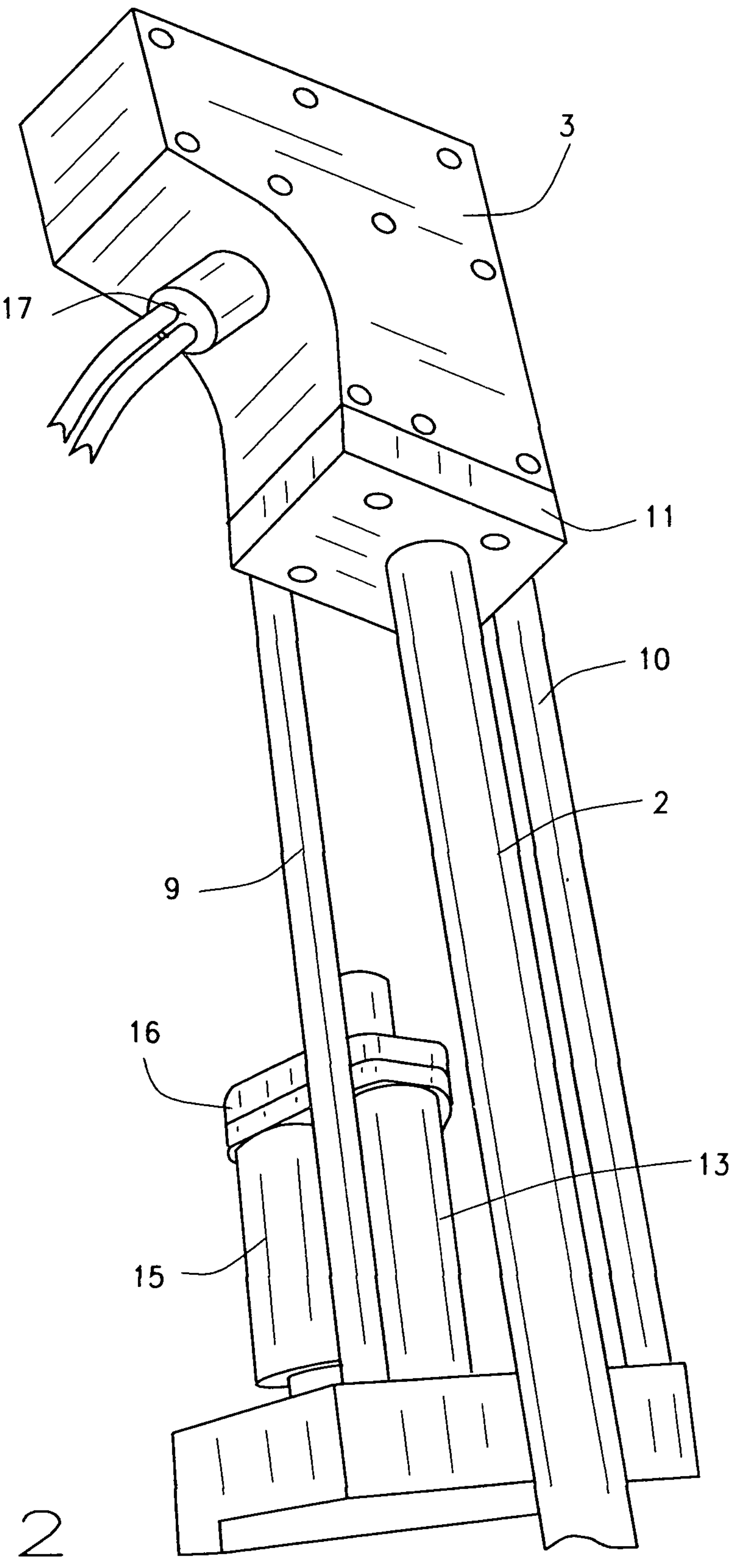
FIG. 2 is an isometric view of the upper portion of the operative transducer mount of this invention.

As can be seen in FIG. 2, the cylinder housing 13 for the drive shaft has an upper plate, as at 16, that connects onto the drive rod cylinder housing 13, and also mounts the motor means 15, as can be seen. This is what provides the energization for the movement of the drive rod 14, between its upper and extended lower positions, as previously explained.

As also noted in FIG. 2, the motor and gear box housing 3 is mounted onto its plate 11, which has the transducer shaft 2 extending therethrough, and which shaft is rotated through the operations of the motor and gears contained within the housing 3, as previously reviewed. All of these components are secured with the guide rods 9 and 10 and are raised and lowered consistently by means of the operations of the cylinder housing 13, and its extendable drive rod 14, relative to the mounting base plate 8, as can be noted.

Figure 5A:
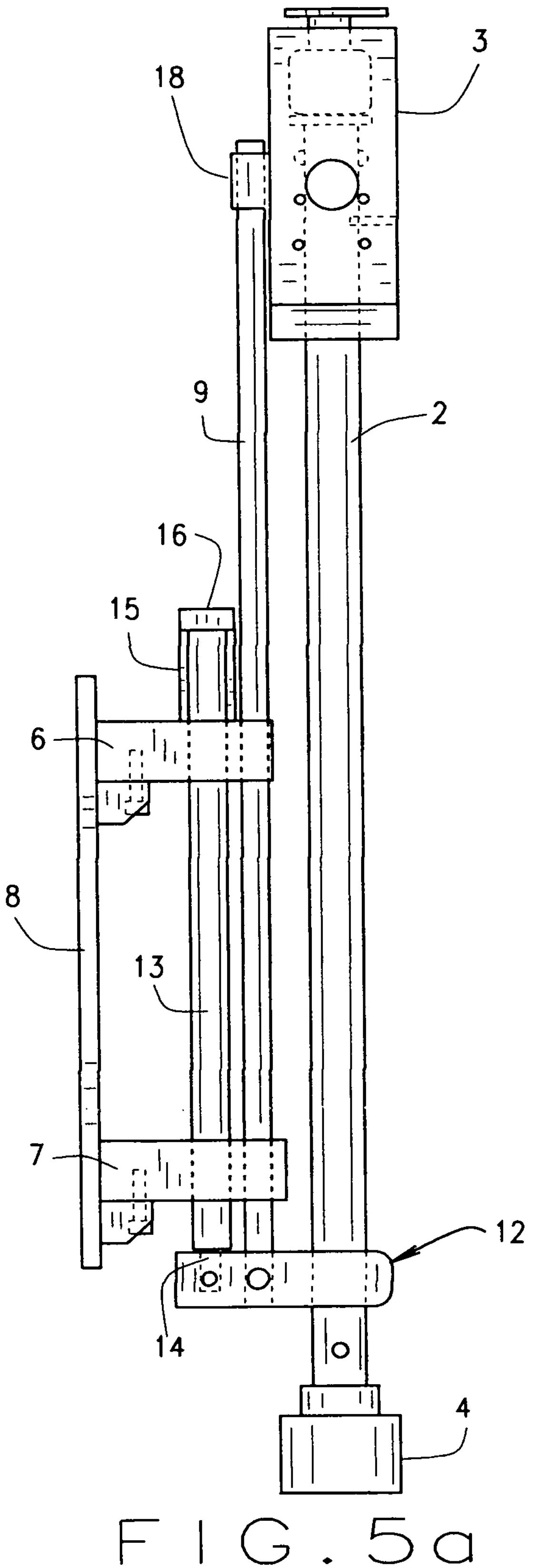
FIG. 5(*a*) is a side view of the operative transducer mount in its elevated condition.
Figure 5B:
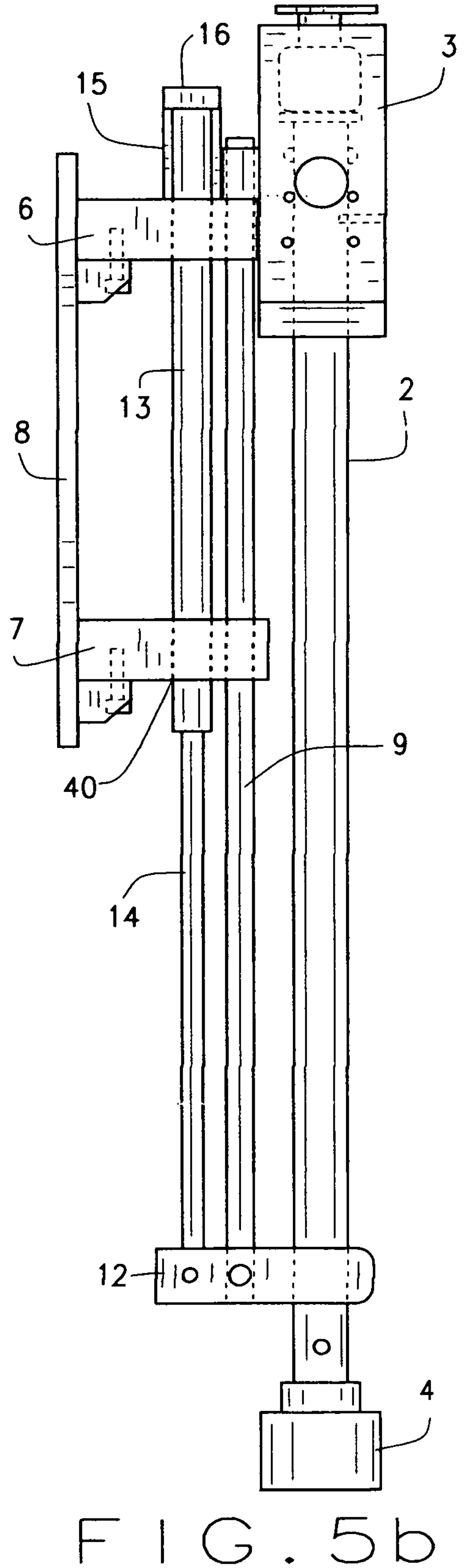

Furthermore, as can be seen in FIG. 2, the various electrical connections can be installed, with the motor housing 3, as can be seen at 17, in said FIG. 2. As also noted in FIG. 5(*a*), the entire motor housing 3 is secured by means of the mount 18 to the various guide rods 9 and 10, as can be noted. Thus, when the housing 13 has its mounted motor 15 actuated, and extends its drive rod 14 downwardly, it lowers the transformer bracket 12, its connected guide rods 9 and 10, and brings with it the transducer shaft 2, and the housing 3, and all of its operative components. Under this condition, the transducer mounting plate 4 is lowered, with its transducer, into the water, to scope the surrounding underwater terrain, as can be understood. This is the position of the operative components, lowered into the water, as can be seen in FIG. 5(*b*). Then, when the drive rod 14 is raised, it pulls up its transformer bracket 12, and its connected guide rods 9 and 10, which slide upwardly through the upper and lower brackets 6 and 7, to pull the transducer out of the water, as when it is desired to move the associated boat.

Figure 3:
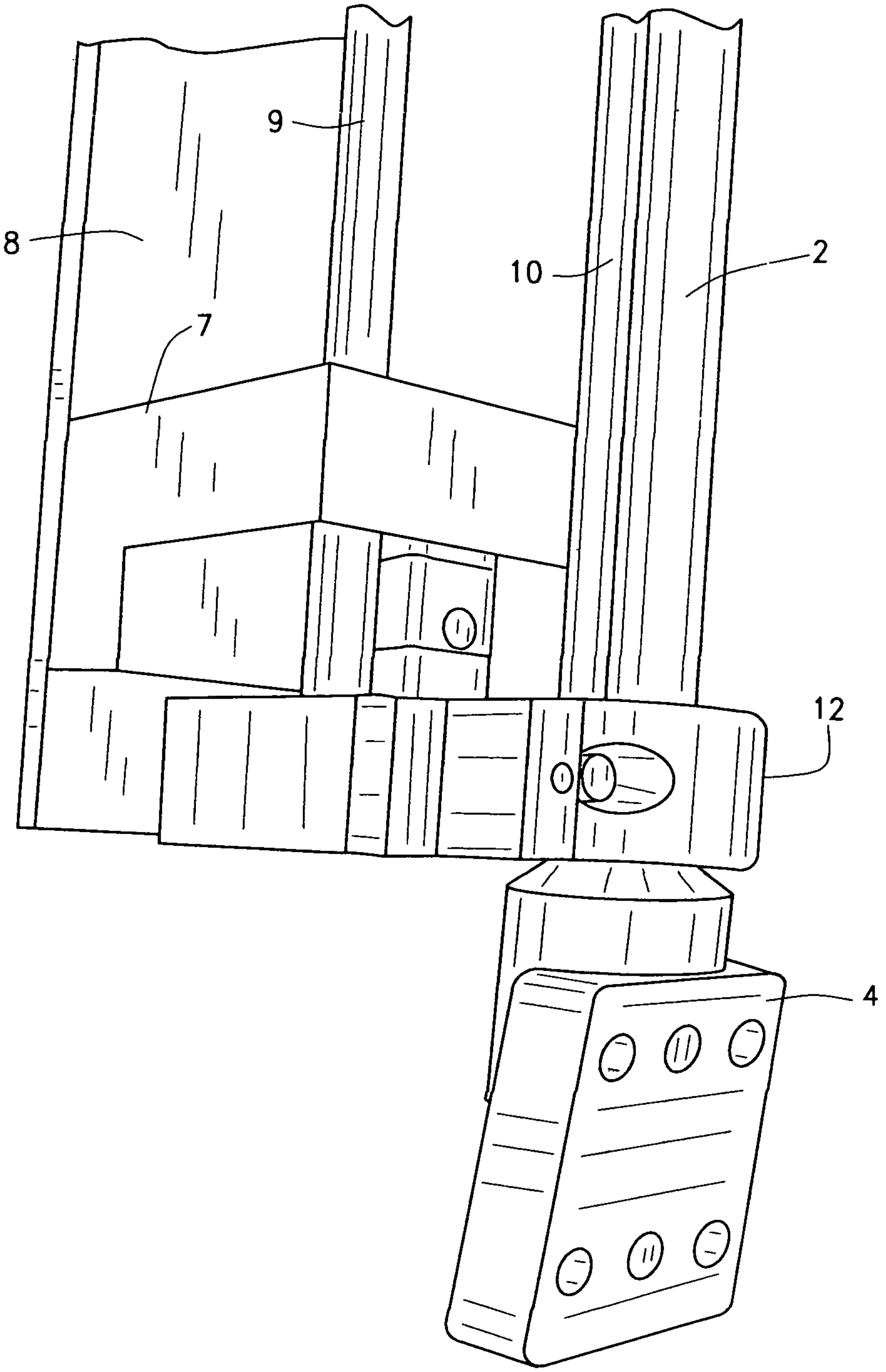
FIG. 3 is a lower half view of the operative transducer mount of this invention.

FIG. 3 provides a little clearer picture of the lower bracket 7, secured with its base plate 8, and how the guide rods 9 and 10 extend downwardly through said lower plate 7, and connect with the transformer bracket 12, as can be seen. The transducer shaft 2 extends through the transformer bracket 12, for pivot or rotation, of its mounted transducer, upon the transducer plate 4, but since the motor housing 3 at the top of the transducer shaft is secured to the guide rods 9 and 10, all of these components, the guide rods, the transducer shaft, its associated motor housing 3, they are fixed to the upper end of the guide rods, all shift downwardly in the manner as can be noted in said FIG. 5(*b*), as previously explained.

Figure 4:
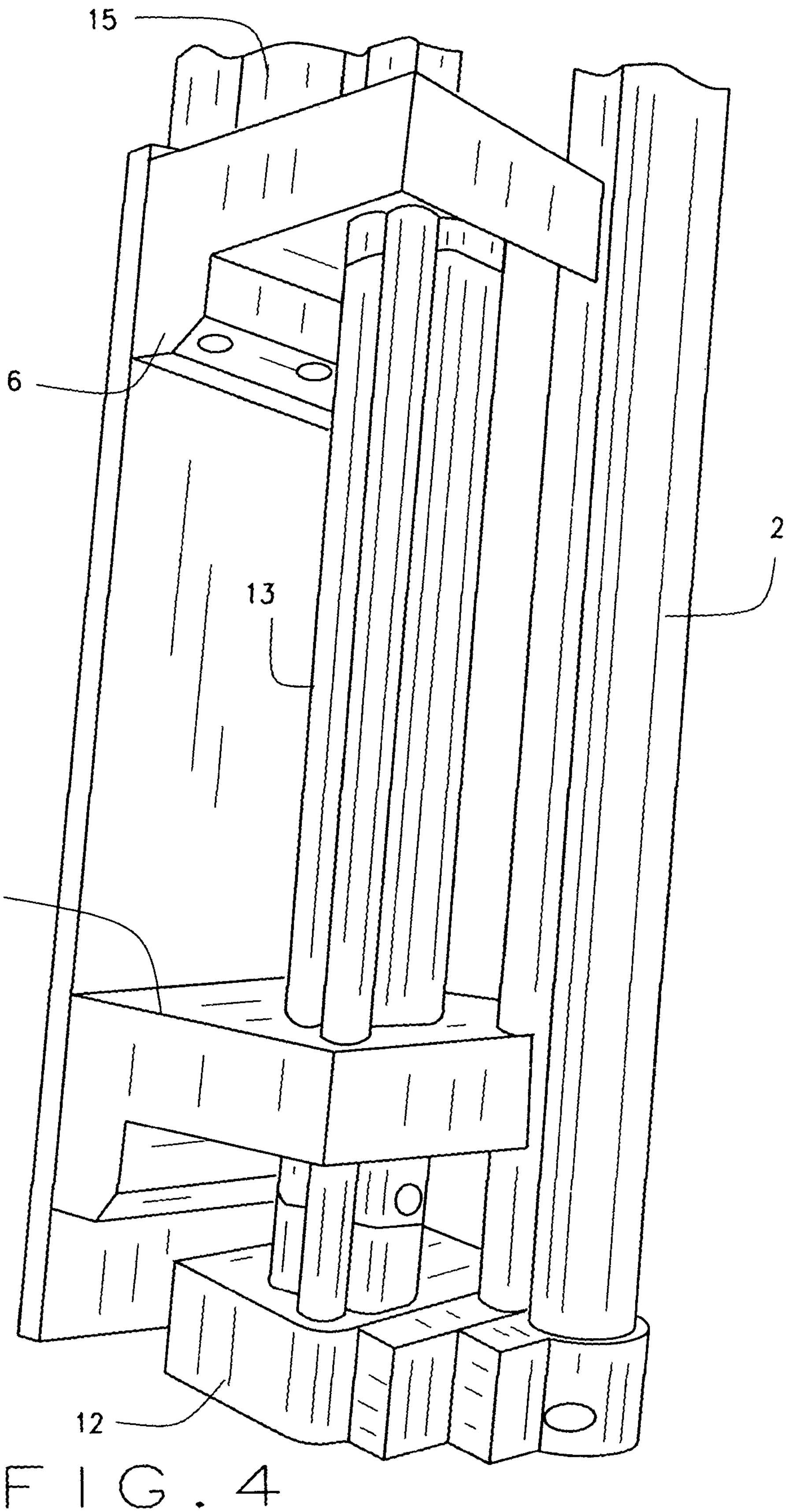
FIG. 4 is the isometric view of the mounting bracket holding the operatively mounted transducer of this invention.

FIG. 4 provides a closer view of the upper and lower brackets 6 and 7, how the guide rods 9 and 10 extend through these brackets, and how the guide rods at their bottoms, are secured with the transformer bracket 12, as previously explained. Furthermore, the drive cylinder housing 13 extends through the two upper lower brackets 6 and 7, has its upper end connected with the cylinder motor 15 for the purpose of extending its drive rod 14, downwardly, to lower the transformer bracket 12, and its connected components, as previously reviewed. When lowered, it also rowers the transducer shaft 2, and its transducer mounting plate and the transducer downwardly, for operative application down in the water, to some depth, which normally will clear the bottom of the boat, its motor, the trolling motor, and any other parts of the boat that would otherwise provide interference with the clear sonic transducer scanning of the underwater terrain, and the surrounding area.

Figure 6:
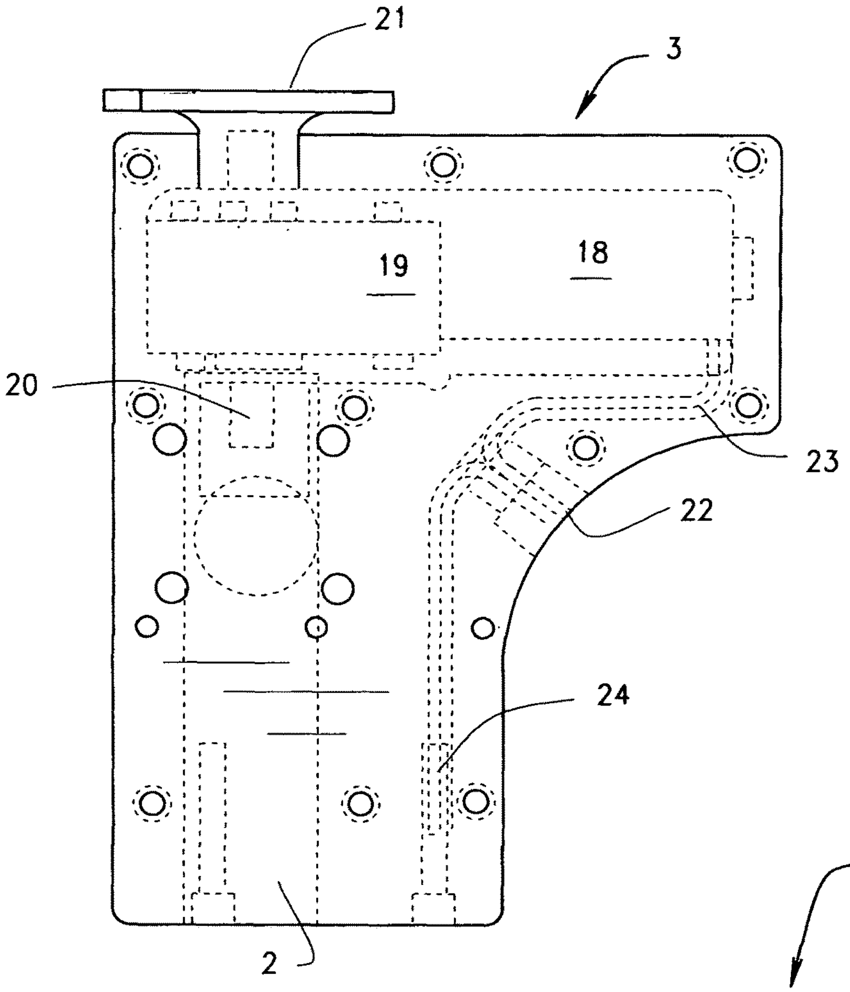
FIG. 6 is a side view of the upper housing for the motor means provided for 360° rotation of the transducer shaft, and its transducer.

More detail relating to the motor and gear box housing 3 can be seen in FIG. 6. The motor, as previously explained, is noted at 18. It connects with its gear box housing 19 in order to reduce the speed of rotation and revolution of the associated transducer shaft 2 so that it pivots at a more controlled speed, when it is desired to pivot the transducer down in the water, when scanning the underwater topography. The gear box 17 contains the reduction gearing and has an extending shaft 20 interconnecting with the top of the transducer shaft 2, to provide for their interconnection. Manual turning of the transducer can be achieved through turning of the associated handle 21 when that form of scanning is desired.

The various electrical connections can be engaged through the application of the socket 17, as previously noted in FIG. 2, by plugging it into the receptacle 22. Electrical connection through the circuit line 23 energizes the motor 18, when applied. Further electrical circuit lines 24 extend downwardly and provide the charge necessary for transmission of electrical energy to the transducer, for its operations. In addition, further circuit lines may connect with the drive cylinder 13, that motivates the drive rod 14, during its raising or lowering of the transducer components relative to the water level. Such a housing 3 is reasonably hermetically sealed so as to prevent moisture from penetrating within it, so as to preserve the integrity of its various components, whether they be mechanical, or electrical, in their functioning.

Figure 7A:
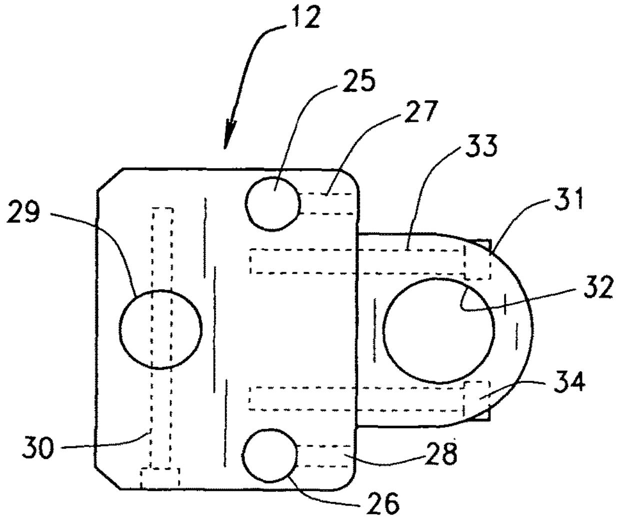
FIG. 7(*a*) is a top view of a transformer bracket securing the transducer shaft to its mount.
Figure 7B:
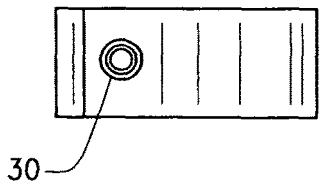

FIG. 7(*a*) shows a top view of the transformer bracket 12. It discloses the pair of lateral apertures 25 and 26 into which the guide rods 9 and 10 are secured, by the introduction of fasteners through the shown apertures 27 and 28. In addition, the aperture 29 is provided for securing the bottom of the drive rod 14, though the locating of a fastener through the shown aperture 30, provided therein. Then, forwardly extending from the transformer bracket 12 is a sleeve like member 31, which has an opening 32 provided therein, and it is through this opening that the transducer shaft 2, extends, for pivoting therein, when operated. Since the transformer bracket 12 secures the guide rods 9 and 10, and the motor housing 3, with its transducer shaft 2, is secured to the upper end of the said guide rods, as at 18, these entire components are moved vertically, upon operations of the drive cylinder housing 13, and its drive rod 14, when it is lowered or raised during its operations.

FIG. 7(*b*) shows the transformer bracket 12, before its sleeve member 31 is fastened thereto, by means of its fasteners 33 and 34, as can be noted.

Figure 8A:
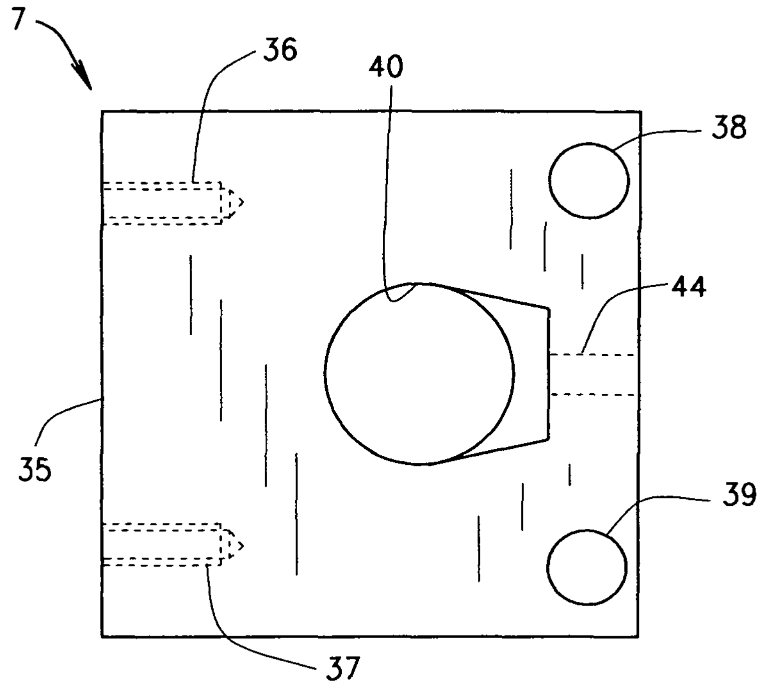
FIG. 8(*a*) is a top view of the upper bracket securing the drive cylinder shaft for use for elevating or lowering the transducer shaft during its operations.
Figure 8B:
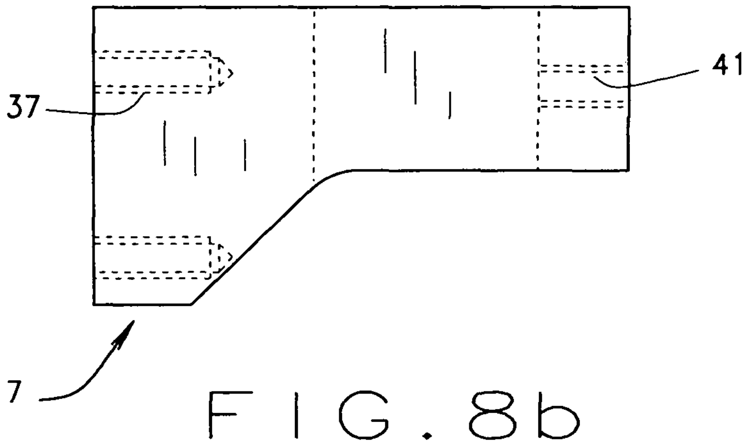

FIGS. 8(*a*) and 8(*b*) provide a top and side view of the upper and lower brackets 6 and 7, as previously reviewed. Since these brackets are very similar in appearance, they have the same dimensions and configurations in their mounting to the base plate 8, as previously reviewed. As noted, the bracket noted at 7, and which could just as easily be identified as the upper bracket 6, includes its back edge 35 having a pair of threaded openings 36 and 37 extending therein, and into which fasteners may be applied when securing these upper and lower brackets to their base plate 8, in preparation for mounting. There are a pair of forwardly located apertures 38 and 39, and the guide rods 9 and 10, respectively, extend through these apertures to allow for the shifting of the guide rods, and its various supported components, including the transducer, to be elevated, or to be lowered, depending upon the usage desired for the operatively mounted transducer, in preparation for usage, or to be withdrawn from the water, as previously reviewed. The aperture 40 is provided for extension therethrough of the cylinder housing 13, which may be fastened therein when assembled, so that the housing 13 will extend slightly below the lower bracket 7, as can be seen in FIG. 5(*b*). A fastener will extend through the aperture 41 to secure the housing 13, within the lower bracket 7, as can be understood. There are other apertures shown provided within the lower bracket 7, and also within its upper bracket 6, for securement of the brackets to their base plate 8.

The foregoing provides a structural analysis of the stern operatively mounted universal transducer for a boat, for this invention. Variations or modifications to the subject matter of this invention may occur to those skilled in the art upon review of the invention as disclosed herein. Such variations, if within the spirit of this invention, are intended to be encompassed within the scope of any claims to patent protection issuing upon this development. The Description of the Preferred Embodiment, and the depiction of the structure of the invention in the drawings, are primarily set forth for illustrative purposes only.

I claim:

1. A mounting device for mounting a sonic transducer to a boat, comprising:
- a mount for securement to the boat, the mount comprising a base plate, an upper bracket and a lower bracket, the upper bracket being secured to the base plate and the lower bracket being secured to the base plate in spaced relationship with the upper bracket;
- at least one guide rod extending through the upper bracket and the lower bracket, wherein the mount supports movement of the at least one guide rod with respect to the base plate, the upper bracket and the lower bracket;
- a drive shaft housing mounted to and extending between the upper bracket and the lower bracket, the drive shaft housing comprising a telescopic drive rod and a drive motor, wherein the drive motor is configured to extend the telescopic drive rod between a retracted position and an expanded position;
- a transducer shaft arranged parallel to the at least one guide rod;
- a transducer bracket for mounting a sonar transducer, the transducer bracket being mounted at a lower end of the transducer shaft;
- a motor housing in connection with the at least one guide rod and the transducer shaft, the motor housing comprising a motor and at least one gear;
- a transformer bracket being mounted to the transducer shaft at a location between the transducer bracket and the motor housing; and
- wherein the telescopic drive rod of the drive shaft housing is configured to move the at least one guide rod through the upper bracket and the lower,
- wherein operation of the telescopic drive rod of the drive shaft housing enables concurrent vertical movement of the transducer shaft,
- wherein the motor and the at least one gear of the motor housing is configured to pivot the transducer shaft.

2. The mounting device of claim 1, wherein the at least one guide rod comprises two guide rods.

3. The mounting device of claim 1, wherein the drive motor of the drive shaft housing is one of an electrical motor, a hydraulic motor, and a pneumatic motor.

4. The mounting device of claim 1, wherein the drive motor of the drive shaft housing is an electric motor.

5. The mounting device of claim 1, further comprising a transducer plate in connection with a bottom of the transducer shaft.

6. The mounting device of claim 5, wherein the transducer plate is positioned at an angle of 8° from a vertical axis.

7. The mounting device of claim 2, wherein the two guide rods are secured to the transformer bracket.

8. The mounting device of claim 1, wherein the motor housing further comprises an electrical receptacle to receive an electrical plug, the electrical plug being configured to provide electrical energy to the drive motor and the at least one gear.

9. The mounting device of claim 1, wherein the drive shaft housing is mounted to the upper bracket.

10. The mounting device of claim 7, wherein the transformer bracket comprises an aperture through which the transducer shaft extends for pivotal movement.

11. A mounting device for mounting a sonic transducer to a boat, comprising:
- a transducer shaft;
- a transducer bracket for mounting a sonar transducer, the transducer bracket being mounted at a lower end of the transducer shaft;
- a two-part mount, the two-part mount comprising a first part configured to extend the transducer shaft between a retracted position and an expanded position and a second part configured to pivot the transducer shaft, wherein the two-part mount comprises a telescopic drive rod and one or more guide rods;
- a motor housing comprising a motor, wherein the motor is configured to provide power to extend and pivot the transducer shaft; and
- a transformer bracket being mounted to the transducer shaft at a location between the transducer bracket and the motor housing;
- wherein the transducer shaft extends through the transformer bracket,
- wherein operation of the telescopic drive rod of the two-part mount enables concurrent vertical movement of the transducer shaft.

12. The mounting device of claim 11, wherein the movement of the at least one guide rod is in a vertical direction.

13. The mounting device of claim 11, wherein the transducer shaft is moveable in a vertical direction by actuation of the drive motor and the drive rod.

14. The mounting device of claim 1, wherein the drive motor is mounted to an upper end of the drive shaft housing.

15. The mounting device of claim 1, wherein the motor and the at least one gear of the motor housing are configured to pivot the transducer shaft in a 360° pivot.

16. The mounting device of claim 11, wherein the first part of the two-part mount is configured to move the transducer shaft in a vertical direction.

17. The mounting device of claim 11, wherein the second part of the two-part mount is configured to pivot the transducer shaft in a 360° pivot.

18. The mounting device of claim 11, further comprising a transducer plate in connection with a bottom end of the transducer shaft.

19. A stern operatively mounted universal transducer for a boat comprises:
- a transducer shaft having an upper end and a lower end;
- a housing disposed at the upper end of the transducer shaft;

a motor located within the housing for rotating the transducer shaft in at least one of a clockwise direction and a counterclockwise direction;

a transducer bracket for mounting a sonar transducer, the transducer bracket being mounted at the lower end of the transducer shaft;

a transformer bracket being mounted to the transducer shaft at a location between the transducer bracket and the housing;

a base plate for attachment of the stern operatively mounted universal transducer to the boat;

an upper bracket secured to the base plate and a lower bracket secured to the base plate in spaced relationship with the upper bracket;

a pair of guide rods that extend through the upper bracket and the lower bracket, each of the guide rods being secured at one end to the housing and at the opposite end to the transformer bracket;

a cylinder housing being mounted between the upper bracket and the lower brackets, the cylinder housing having a motor disposed therein;

a telescopic drive rod secured at one end to the transformer bracket and the upper bracket at the opposite end, the telescopic drive rod being selectively moveable between an extended position and a retracted position by operation of the motor within the cylinder housing to move the transducer shaft and thereby the transducer bracket relative to the base plate.

20. The stern operatively mounted universal transducer of claim 19, wherein the transducer bracket is positioned at an angle of 8° from a vertical axis.

* * * * *